Sept. 9, 1969     P. CUSHING, JR     3,466,522

SPEED CONTROL CIRCUITS FOR ELECTRIC MOTORS

Filed Oct. 11, 1966

INVENTOR
PRENTICE CUSHING, JR.
BY
ATTORNEY

United States Patent Office 3,466,522
Patented Sept. 9, 1969

3,466,522
SPEED CONTROL CIRCUITS FOR
ELECTRIC MOTORS
Prentice Cushing, Jr., Douglaston, N.Y., assignor to G. K.
Heller Corp., Las Vagas, Nev., a corporation of Nevada
Filed Oct. 11, 1966, Ser. No. 585,976
Int. Cl. H02k 27/20; H02p 5/00
U.S. Cl. 318—331                                13 Claims

ABSTRACT OF THE DISCLOSURE

In an electric circuit for operating a DC motor having a shunt field winding and in which the motor speed is regulated by controlling the voltage applied to the motor armature, first and second parallel paths are presented for the field current and respectively provide large and small field voltages when the field current flows in the respective paths, and the flow of field current in the first path is progressively blocked in response to rising counter EMF of the armature with increasing motor speed, to reduce the field current, and hence weaken the field, down to a predetermined minimum value as determined by the small field voltage provided by the second path, thereby to extend the speed range of the motor beyond its base speed.

---

This invention relates generally to speed control circuits for electric motors, and particularly for shunt wound, direct current motors.

In the operation of shunt wound, direct current motors, it is desirable that the motor be started with a high field current to obtain maximum torque at starting. However, if one continues to apply full voltage to the field as the motor speed increases, then the speed range of the motor is limited to the so-called base speed, that is, the speed resulting with full voltage on the armature and the field. In view of the foregoing, it has been known to provide rheostats operative to adjust the armature voltage and the field current, respectively, and which are coupled together for simultaneous manual actuation so that, as the motor speed is increased, the field is weakened to extend the speed range beyond the base speed. Such manually actuated controls are disadvantageous in that the motor may be halted and then restarted with the rheostats at a setting providing a weakened field, and consequently low torque for starting. Further, in arrangements where the armature energizing voltage is automatically controlled to regulate the motor speed, manual control of the field current is not suitable for extending the speed range.

Although systems have been proposed for automatically weakening the field as motor speed increases, such systems are complicated and relatively costly, and do not reliably provide the desired close correspondence between field strength and motor speed.

Accordingly, it is an object of this invention to provide relatively simple and inexpensive arrangements for automatically extending the range of available speeds of shunt wound, direct current motors while ensuring that maximum torque will be available for starting at all times.

Another object is to ensure that high field strength will be restored whenever the motor speed is reduced, for example, upon application of load to the motor or reversing the direction of rotation thereof.

In accordance with an aspect of this invention, a shunt wound, direct current motor having its speed controlled by regulation of the armature energizing voltage is provided with means responsive to counter EMF of the armature to weaken the field down to a predetermined minimum value upon increasing motor speed, thereby to extend the speed range beyond the base speed.

The desired field weakening is preferably achieved by providing two parallel paths for conducting the field current, the flow of field current through one of the paths being progressively blocked by armature counter EMF which increases with increasing motor speed, whereupon the other path establishes a reduced field current therethrough corresponding to the desired minimum value of the weakened field.

The path which is progressively blocked by rising armature counter EMF may extend through the armature itself and have a diode or other unidirectional means therein. The other path may include a resistor in series with the field to reduce the voltage drop across the latter and hence lower the field current when the only path therefor is through such resistor. Alternatively, the path for establishing a reduced field current may connect a source of reduced voltage across the field and thereby weaken the field when the path through the armature is blocked.

The path for field current which is progressively blocked by rising armature counter EMF need not extend through the armature. Thus, such path may include a resistor, which can be in the form of a light bulb so as to have non-linear characteristics, and across which the armature counter EMF builds up a voltage bucking the field current until it reaches the voltage set by another resistor determining the minimum weakened field. Alternatively, the path for field current which is progressively blocked by rising armature counter EMF can include a transistor or other control element shunting the resistor which determines the minimum weakened field and being controlled by the counter EMF.

The above, and other objects, features and advantages of the invention, will be apparent in the following detailed description of illustrative embodiments thereof which is to be read in connection with the accompanying drawings, wherein.

In the several views of the drawings, the same reference numerals are used to refer to the same parts.

Figures 1, 2:
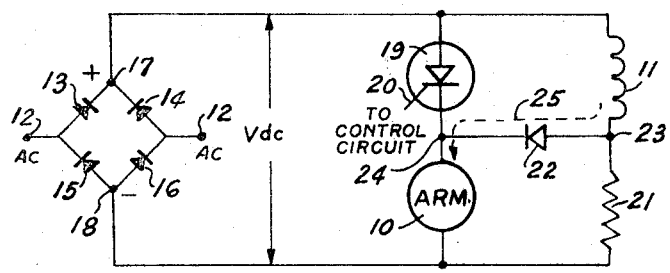
FIG. 1 shows a motor control circuit in accordance with one embodiment of this invention.
FIG. 2 shows a circuit similar to that of FIG. 1 but with the control element in negative.

Referring to FIG. 1, there is shown an armature 10 of a direct current motor having a shunt field winding 11. A source of alternating current represented by terminals 12 has connected thereto a conventional single phase, bridge-type rectifier including four rectifier units, for example, diodes 13, 14, 15 and 16, arranged as shown to effect full wave rectification of the alternating current, that is, to provide a rectified output at points 17 and 18 of the bridge having a pulse in each half-cycle of the alternating current input.

A control element 19, for example, in the form of a controlled rectifier as shown, is connected in series with motor armature 10 across points 17 and 18 so that forward bias is applied to the controlled rectifier at each half cycle of the alternating current source. The controlled rectifier 19 may be of the well known SCR type which is operative to block in the forward direction until a signal is applied to its gate electrode 20, whereupon the rectifier continues to conduct in the forward direction, even after the gate signal is removed, so long as the current through the device is greater than the so-called "holding current." When the current through the device falls below the holding current, the rectifier 19 reverts to its forward blocking condition. The gate electrode 20 may be connected to a suitable conventional control circuit (not shown) which provides the gate signal controlling the point in the alternating current cycle at which the controlled rectifier 19 switches from its blocking to its conducting state. Such control circuit connected to gate electrode 20 may be, for example, of the well known magnetic amplifier type, or of the relaxation oscillator type, such as is illustrated in U.S. Patent No. 3,244,965 to F. W. Gutzwiller. Thus, the energizing voltage applied to armature 10 may be varied to change the motor speed by varying the portion of each pulse of the rectified output of the bridge applied to the armature.

In accordance with this invention, the shunt circuit of the field winding 11 has connected in series with the latter a resistance 21 constituting one path for field current, and another path for field current is provided by a unidirectional element 22, which may be constituted by a diode as shown, connected between a junction 23 intermediate field 11 and resistance 21 and a junction 24 intermediate controlled rectifier 19 and armature 10. Diode 22 is arranged to conduct in the direction from junction 23 toward junction 24.

It will be apparent that, when a zero voltage is applied to armature 10 through control element 19, field current can flow, as indicated by the broken arrow 25, from field winding 11 through diode 22 and armature 10, whereby a maximum field strength is obtained for starting. As the motor speed increases, the armature counter EMF likewise increases and opposes the current flow through diode 22 until the current flow represented by the arrow 25 is reduced to zero, at which time the field current can only flow through resistance 21. Thus, as motor speed increases the field strength is reduced progressively to a minimum value determined by resistance 21. Such weakening of the field with increasing armature counter EMF as a function of motor speed serves to extend the range of available speeds under the control of rectifier 19, while ensuring that the desired high field strength for maximum torque will always be available for starting or whenever the armature counter EMF is otherwise reduced or at a low value. For example, if an increased load is applied to the motor while operating at speed, that is, with a weakened field, the reduction in motor speed and hence in armature counter EMF immediately results in increased field current to augment the torque for driving the increased load.

Although the circuit of FIG. 1 is shown to include a controlled rectifier 19 or SCR for controlling the motor speed by varying the voltage applied to the armature, a tube or other control element can be substituted for rectifier 19 to control the motor speed. Further, the circuit may operate with half-wave rectified power rather than the full-wave rectification, as shown.

In a typical example employing the control circuit shown on FIG. 1, the resistance of armature 10 is 40 ohms and the resistance of field 11 is 800 ohms. If the voltage output at points 17 and 19 (v. DC) is 100 volts, and the resistance 21 has a value of 1200 ohms, then the voltage across field 11 will be 95.4 volts when the armature voltage is zero (that is, when diode 22 is conducting), and the voltage across field 11 will be reduced to 40 volts when the flow of current through diode 22 is completely blocked.

As shown on FIG. 2, an arrangement similar to that described above with reference to FIG. 1 may be provided where the controlled rectifier or SCR 19 is in negative relation to the armature 10. Here again, when armature voltage is zero, current can flow through armature 10 and diode 22 to field 11 to provide full field voltage. However, as armature voltage rises, flow of field current through the armature is blocked and the field voltage is limited to the minimum value determined by resistance 21.

In each of the embodiment illustrated by FIGS. 1 and 2, the minimum value of field voltage, when the flow of field current through the armature is fully blocked by its counter EMF, is determined by the resistance 21 connected in series with the field winding 11 across the full voltage D.C. output of the bridge at points 17 and 18. However, the field voltage may be otherwise reduced to weaken the field when the flow of field current through the armature is halted. Thus, as shown in FIG. 3, a unidirectional element 26, for example, a diode, is interposed between junction 23 and one of the alternating current input terminals 12, and is conducting only in the direction away from junction 23.

When the armature voltage is zero, field current can flow through diode 22 and armature 10, as indicated by the arrow 25, and a high field voltage is obtained for maximum torque at starting. As the motor speed and armature counter EMF are increased, field current flow through diode 22 is blocked and the field 11 is then connected between point 17 and one of the AC terminals 12. Alternate pulses from point 17 will be bucked by the opposite bias at the connected terminal 12 so that the field 11 will receive energizing pulses only during alternate half-cycles of the A.C. supply, and thereby be weakened to extend the range of available speeds. If, for example, 100 volts D.C. is provided across points 17 and 18 of the bridge, then only 50 volts D.C. will be available between points 17 and 12 to energize the field 11 when field current flow through diode 22 is blocked by armature counter EMF. Of course, any other source of reduced voltage, for example, a battery, could be connected to the field winding to provide the weakened field when the flow of field current through the armature is blocked.

Figure 3:
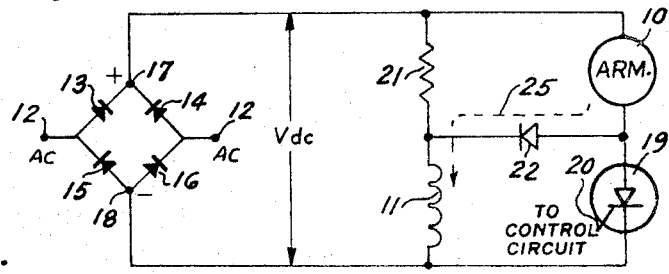
FIG. 3 shows another embodiment of the invention in which the minimum, weakened field is determined by a half-bridge arrangement.
Figure 4:
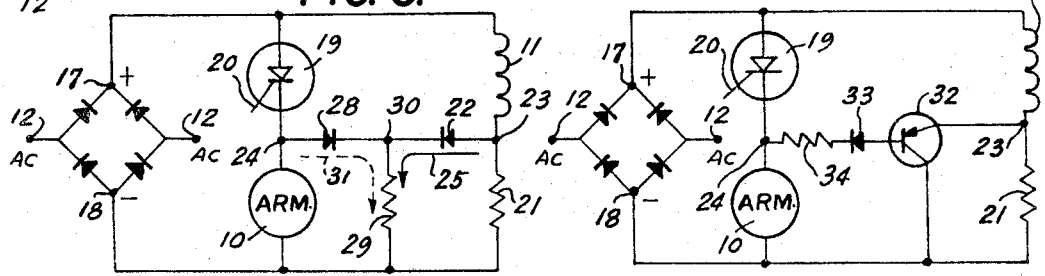
FIG. 4 shows the embodiment of FIG. 3 employed in a circuit for operating the motor in both directions.

Referring now to FIG. 4, it will be seen that the control circuit of FIG. 3 is there shown with a reversing switch 27 included between armature 10 and the line connecting junction 24 with point 18 of the bridge so that the motor can be operated in either direction. The control circuit embodying this invention is particularly advantageous in connection with such an arrangement for reversing the motor as it ensures that, upon each reversal of the motor, the field current is automatically and immediately increased to increase the torque above the value that would be attained if the field were left weak during reversal.

In some instances, for example, in the case of low power motors having high resistance armatures, it may be desirable to avoid the passage of field current through the armature as such field current may be sufficient to cause continued turning of the motor even when the voltage applied to the armature through control element 19 is reduced to zero.

Figures 5, 6:
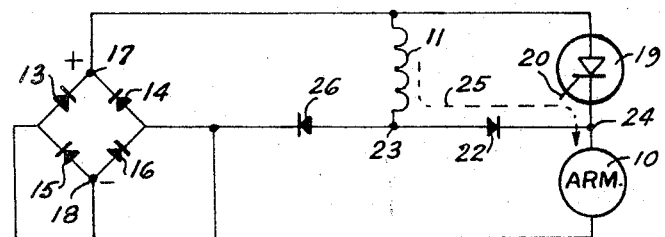
FIG. 5 shows another embodiment of the invention in which the passage of field current through the armature is avoided.
FIG. 6 shows still another embodiment in which the passage of field current through the armature is avoided.

Referring now to FIG. 5, it will be seen that a circuit according to this invention in which passage of field current through the armature 10 is avoided has the controlled rectifier 19 and the armature 10 connected in series across points 17 and 18 of the bridge and the field 11 and resistance 21 also connected in series in a shunt circuit. Oppositely conducting unidirectional elements or diodes 22 and 28 are interposed in a line between junctions 23 and 24, and a resistance 29 shunts armature 10 from a junction 30 intermediate diodes 22 and 28 and has a value substantially less than that of resistance 21.

With the circuit shown on FIG. 5, field current will follow a path, as indicated by the arrow 25, from field winding 11 through diode 22 and through resistance 29 when the armature voltage is zero, and the field current is blocked from flowing through the armature by diode 28. As the armature counter EMF increases with increasing motor speed, current flows through diode 28, as indicated by the arrow 31, and builds up a voltage across resistance 29 which bucks the field current. When the voltage built up across resistance 29 is equal to the voltage drop across resistance 21 the field voltage attains its minimum value. Thus, with increasing motor speed the field strength is reduced to a minimum value set by resistance 21 so as to extend the range of available speeds.

In a typical example of the circuit shown on FIG. 5, the motor has a field resistance of 1400 ohms and an armature resistance of 100 ohms, and the resistances 21 and 29 have values of 4000 ohms and 250 ohms, respectively. With such an arrangement, there is obtained a field voltage of 90 volts when the armature voltage is zero, and a field voltage of 30 volts when the armature voltage is 120 volts.

Although the above arrangement operates satisfactorily in weakening the field automatically with increasing motor speed, the resistance 29 may dissipate 50 to 60 watts at full power, which would be objectionable. Therefore, it is preferred to use a non-linear resistance at 29 to reduce the power usage. For example, the resistance 29 may be constituted by a 15 watt light bulb which results in a satisfactory field voltage of 80 volts when the armature voltage is zero. When a light bulb is used for resistance 29, the circuit has the further advantage of giving an indication of motor speed by the illumination or non-lumination of such light bulb.

Referring now to FIG. 6, it will be seen that, in another circuit avoiding the passage of field current through the armature, the problem of the dissipation of heat from the resistor 29 of FIG. 5 is eliminated by substituting for such resistor 29 a control element 32 shunting resistance 21. Control element 32 is shown in the form of a PNP transistor connected through diode 33 and resistance 34 to junction 24. Diode 33 prevents reverse current from damaging the base of transistor 32, while resistance 34 limits the current to that needed to saturate transistor 32 when the armature voltage is zero.

When armature voltage is zero, field current will pass through transistor 32 shunting resistance 21 and a high field voltage and consequently high torque will be attained. As the motor speed increases, the increasing armature counter EMF will cause transistor 32 to cut-off until the only path for field current is through resistance 21, thereby weakening the field to extend the range of available speeds.

It will be apparent that, in the arrangement of FIG. 6, other control elements, such as, SCR's, tubes and the like, can be substituted for the transistor 32 with conventionally modified control circuitry therefor. Further, in place of the resistance 21 for determining the minimum value of the field voltage, there can be substituted a half-bridge arrangement, as described with reference to FIG. 3, to provide a reduced field voltage when transistor 32 is cut-off.

It will be apparent that, in all of the described embodiments of the invention, a path of relatively low resistance either through the armature or otherwise, is presented to the field current when the armature voltage is low and, as the motor speed, and hence the armature counter EMF increases, such low resistance path is blocked and the field current can then flow only in a path of relatively high resistance or by connection to a relatively low voltage source so as to weaken the field, and thereby extend the range of available speeds over which the motor can be operated by control of the voltage applied to the armature.

Although several illustrative embodiments of the invention have been described in detail herein, it is to be understood that the invention is not limited to those precise embodiments, and that various changes and modifications may be effected therein by one skilled in the art without departing from the scope and spirit of the invention as defined in the appended claims.

What is claimed is:

1. In an electric circuit for operating a direct current motor having an armature and a shunt field winding; means to control the voltage applied to said armature for regulating the motor speed, means presenting first and second parallel paths for the field current and respectively providing relatively large and small field voltages when the field current flows in said first and second paths, and means responsive to counter EMF of said armature to progressively block the flow of field current in said first path as the motor speed increases, and hence weaken the field down to a minimum value predetermined by said small field voltage provided by said second path when the field current flow through said first path is fully blocked, thereby to extend the speed range of the motor beyond its base speed.

2. An electric circuit according to claim 1, wherein said first path includes said armature.

3. An electric circuit according to claim 1, wherein said first and second paths are connected across the same voltage source and present relatively small and large resistances, respectively, to the flow of field current therein.

4. An electric circuit according to claim 3, wherein said first path includes said armature and unidirectional means interposed therein to conduct only in the direction opposed to the effect of said counter EMF of the armature.

5. An electric circuit according to claim 3, further comprising unidirectional means connecting said armature with said small resistance of the first path so that said counter EMF of the armature builds up voltage across said small resistance which bucks the field current in said first path.

6. An electric circuit according to claim 3, wherein said means responsive to said counter EMF includes a transistor interposed in said first path and means applying the armature counter EMF to said transistor to cause the latter to cut-off.

7. An electric circuit according to claim 1, wherein said first and second paths respectively connect said field winding to sources of relatively high and relatively low voltage.

8. An electric circuit according to claim 1, further comprising means for reversing the polarity of the voltage applied to said armature, so that said large field voltage is operative upon each reversal for affording maximum torque.

9. In an electric circuit for operating a direct current motor having an armature and a shunt field winding; a source of D.C. voltage, means connecting said armature to said source and including a control element to vary the voltage applied to the armature and hence the speed of the motor, a resistance connected in series with said field winding across said source, and unidirectional means extending between said field winding and armature and conducting only in the direction of the flow therethrough of field current to provide a low-resistance path for field current shunting said resistance through said armature until armature counter EMF blocks said unidirectional means, whereupon all field current flows through said resistance which thereby determines weakening of the field down to a minimum value.

10. In an electric circuit for operating a direct current motor having an armature and a shunt field winding; a source of relatively high D.C. voltage, a source of relatively low D.C. voltage, means connecting said armature with said source of high voltage including a control element to vary the voltage applied to said armature and hence the speed of the motor, means defining a first path connecting said field winding with said source of high voltage and having therein means responsive to rising armature counter EMF to block said first path, and means defining a second path parallel with said first path and connecting said field winding with said source of low voltage, thereby to weaken the field down to a minimum value predetermined by said source of low voltage when said first path is blocked upon increasing motor speed.

11. An electric circuit according to claim 10, wherein said means defining said first path includes unidirectional means connecting said field winding with said armature and conducting only in the direction of the flow of field current therethrough.

12. In an electric circuit for operating a direct current motor having an armature and a shunt field winding; a source of D.C. voltage, means connecting said armature with said source including a control element to vary the voltage applied to the armature and hence the motor speed, a relatively large resistance connected in series with said field winding to said source, a relatively small resistance, means connecting said small resistance in shunt with said large resistance including unidirectional means conducting only in the direction for flow of field current through said small resistance, and means connecting said small resistance across said armature to provide a voltage build-up across said small resistance by armature counter EMF which voltage build-up bucks field current flow through said small resistance and thereby effects field weakening to a minimum value, predetermined by said large resistance with increasing motor speed.

13. In an electric circuit for operating a direct current motor having an armature and a shunt field winding; a source of D.C. voltage, means connecting said armature with said source through a control element operative to vary the voltage applied to the armature and hence the motor speed, a resistance connected in series with said field winding to said source, a control element normally shunting said resistance to provide a relatively high field voltage for starting, and means connecting the last mentioned control element to said armature and operative to cause cut-off thereof by rising armature counter EMF, thereby to weaken the field upon increasing motor speed for extending the range of available motor speeds.

References Cited

UNITED STATES PATENTS

| 3,214,667 | 10/1965 | Foster et al. | 318—331 X |
| 3,222,585 | 12/1965 | Lobb | 318—331 X |
| 3,222,586 | 12/1965 | Fontenote et al. | 318—331 X |

OTHER REFERENCES

Meng, John—A Full Wave, Speed Regulating Shunt Wound DC Motor Control—General Electric application note 200.25—Aug. 2, 1965—318-331.

ORIS L. RADER, Primary Examiner

H. HUBERFELD, Assistant Examiner

U.S. Cl. X.R.

318—338, 345, 501, 507